United States Patent
Zhang et al.

(10) Patent No.: US 12,405,945 B2
(45) Date of Patent: *Sep. 2, 2025

(54) SEARCHES OF HIGHLY STRUCTURED DATA

(71) Applicant: Palantir Technologies Inc., Palo Alto, CA (US)

(72) Inventors: Kevin Zhang, Palo Alto, CA (US); David Philipson, Palo Alto, CA (US); Arjun Nayini, San Francisco, CA (US); Helen Yu, Bellevue, WA (US); Zennard Sun, Mountain View, CA (US); Antoine Llorca, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/408,885

(22) Filed: May 10, 2019

(65) Prior Publication Data

US 2019/0266153 A1  Aug. 29, 2019

Related U.S. Application Data

(63) Continuation of application No. 14/875,536, filed on Oct. 5, 2015, now Pat. No. 10,296,617.

(51) Int. Cl.
*G06F 7/00* (2006.01)
*G06F 3/0484* (2022.01)
*G06F 16/242* (2019.01)
*G06F 16/25* (2019.01)
*G06F 16/28* (2019.01)

(52) U.S. Cl.
CPC ........ *G06F 16/2428* (2019.01); *G06F 3/0484* (2013.01); *G06F 16/2423* (2019.01); *G06F 16/252* (2019.01); *G06F 16/289* (2019.01)

(58) Field of Classification Search
CPC .............. G06F 16/2423; G06F 16/252; G06F 16/2428; G06F 3/0484; G06F 16/289
USPC .......... 707/766, 779, 999.005, 999.003, 706, 707/722, 769, 802, E17.005, E17.006
See application file for complete search history.

(56) References Cited

U.S. PATENT DOCUMENTS

| 6,141,659 A | * | 10/2000 | Barker | G06F 16/33 707/999.102 |
|---|---|---|---|---|
| 10,078,624 B2 | * | 9/2018 | Nalchadzhi | G06F 16/2246 |
| 2008/0208844 A1 | * | 8/2008 | Jenkins | G06Q 10/10 |
| 2009/0089312 A1 | * | 4/2009 | Chi | G06F 16/9038 |

(Continued)

OTHER PUBLICATIONS

U.S. Appl. No. 14/875,536, filed Oct. 5, 2015.

*Primary Examiner* — Md I Uddin
(74) *Attorney, Agent, or Firm* — Duane Morris LLP

(57) ABSTRACT

Techniques related to searches of highly structured data are described. A body of data may be represented by an object-centric data model. For a search of the body of data, an indication of a particular search template to use may be received. The particular search template may specify one or more hierarchical object types that are within a scope of the search. The one or more hierarchical object types may be defined in the object-centric data model. The particular search template may specify at least one search field. A user interface may be generated based on the particular search template. The user interface may include the at least one search field.

16 Claims, 15 Drawing Sheets

(56) References Cited

U.S. PATENT DOCUMENTS

| | | | |
|---|---|---|---|
| 2012/0109790 A1* | 5/2012 | Bhatia | G06Q 10/10 |
| | | | 705/30 |
| 2014/0074887 A1* | 3/2014 | Neels | G06F 16/248 |
| | | | 707/779 |
| 2014/0096043 A1* | 4/2014 | Raghavan | G06F 9/451 |
| | | | 715/764 |
| 2015/0134633 A1* | 5/2015 | Colgrove | G06F 16/245 |
| | | | 707/706 |
| 2016/0063093 A1* | 3/2016 | Boucher | G06F 16/3322 |
| | | | 707/748 |

* cited by examiner

SEARCH FIELD 500A

SEARCH FIELD 500N

•••

4G LTE 📶                    11:38 AM

< Back          Advanced Search

PROPERTIES

First:   | John |
Last:    | Smith |
DOB:     | 02/29/1980 |
SSN:     | |
Gender:  | M |
Street:  | |
City:    | Palo Alto |
State:   | |
Zip:     | |

DATE RANGE

From: | 01/01/2014 |    To: | 01/01/2016 |

[ SEARCH ]

SEARCHES OF HIGHLY STRUCTURED DATA

CROSS-REFERENCE TO RELATED APPLICATIONS; BENEFIT CLAIM

This application claims the benefit under 35 U.S.C. § 120 as a Continuation of application Ser. No. 14/875,536, filed Oct. 5, 2015, which incorporates by reference application Ser. No. 13/831,199, filed Mar. 14, 2013 (now U.S. Pat. No. 10,037,314), the entire contents of which are hereby incorporated by reference for all purposes as if fully set forth herein. Applicants hereby rescind any disclaimer of claim scope in the parent application(s) or the prosecution history thereof and advise the USPTO that the claims in this application may be broader than any claim in the parent applications.

TECHNICAL FIELD

The present Application relates to information retrieval technology. More specifically, the example embodiment(s) described below relate to searches of highly structured data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers are very powerful tools for searching information. A search engine is a common mechanism that allows users to search for information using computers. A search engine accepts a search query as input. A search query is typically composed of one or more keywords and provides a search result as output. The search result identifies information that the search engine has determined "satisfies" the search query. Search engines often maintain an index of a corpus of information that allows the search engine to efficiently identify information in the corpus that satisfies a given search query.

One type of well-known search engine is an Internet search engine. Internet search engines are useful for searching semi-structured or unstructured data, such as the text content of a web page. However, the user interfaces of Internet search engines typically take a "one size fits all" approach with regard to how the user may scope the search. In particular, Internet search engines typically provide only a single text entry field into which the user enters one or more keywords. The Internet search engine then uses the entered keywords to identify information items that satisfy the entered keywords. This approach works well with the semi-structured and unstructured data that is indexed by Internet search engines, because such data typically is not represented by a highly-structured data model that is known to the user a priori the search. However, for highly structured data represented by a data model that the user has knowledge of prior to the search, the limited user interfaces provided by Internet search engines may be inadequate, inefficient, or cumbersome for users.

BRIEF DESCRIPTION OF THE DRAWINGS

The example embodiment(s) of the present Application are illustrated, by way of example and not limitation, in the accompanying drawings in which like reference numerals refer to similar elements and in which:

FIG. 5A, FIG. 5B, FIG. 5C depict example approaches for obtaining input to search fields.

DESCRIPTION OF THE EXAMPLE EMBODIMENT(S)

Figure 1:
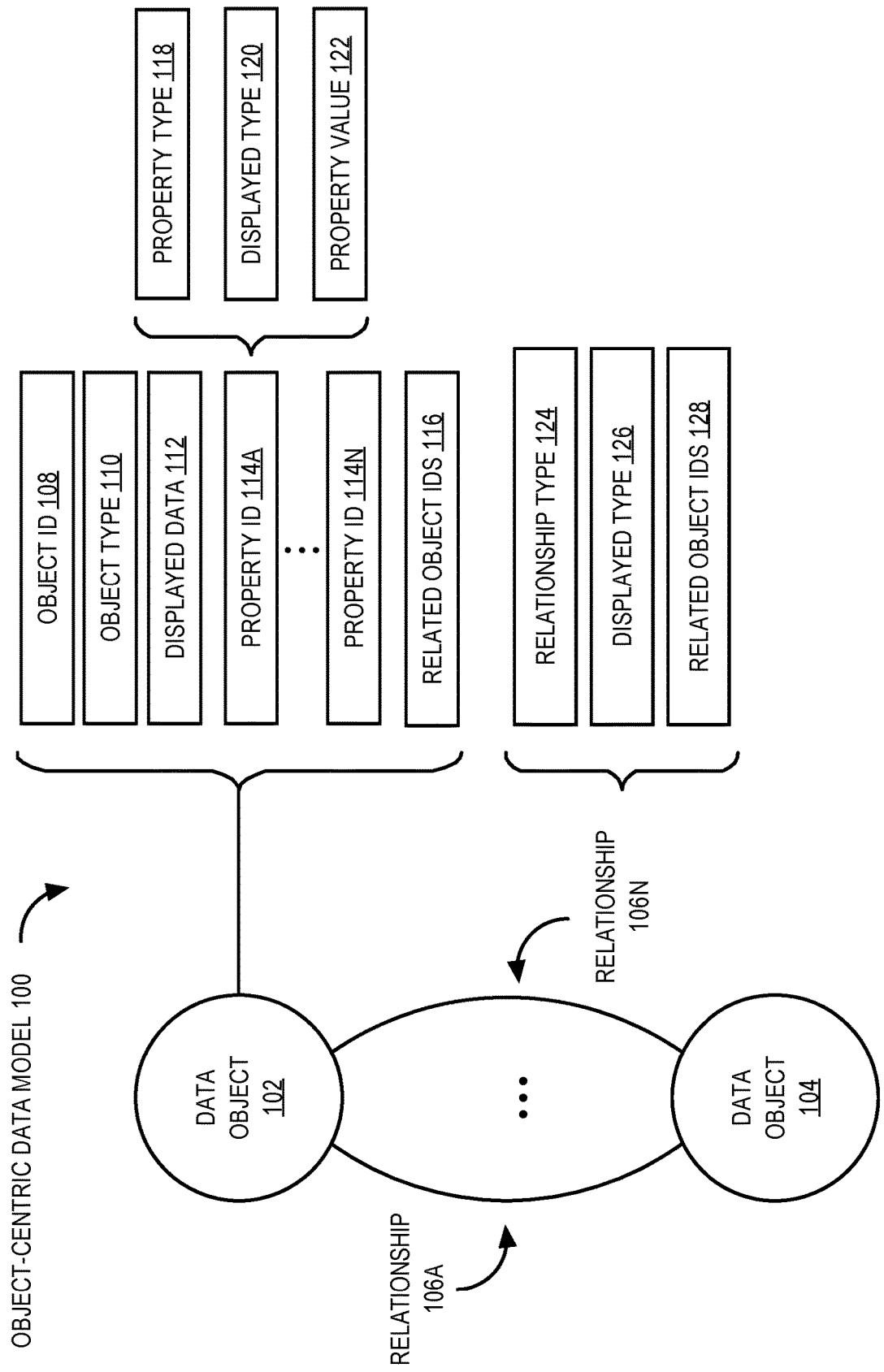
FIG. 1 depicts an example object-centric data model.

In the following description, for the purposes of explanation, numerous specific details are set forth in order to provide a thorough understanding of the example embodiment(s) of the present Application. It will be apparent, however, that the example embodiment(s) may be practiced without these specific details. In other instances, well-known structures and devices are shown in block diagram form in order to avoid unnecessarily obscuring the example embodiment(s). Modifiers such as "first" and "second" may be used to differentiate elements, but the modifiers do not necessarily indicate any particular order.

General Overview

Computer-implemented techniques for helping a user search a body of data that is highly structured are described. In some example embodiments, the body of data is represented by an object-centric data model. The object-centric data model is centered on the notion of data objects and properties of the data objects. Furthermore, the object-centric data model is based on an ontology that defines hierarchical object types and property types. For example, a data object in the body of data may have the hierarchical object type "Employee" and have a "Name" property, a "Title" property," and a "Salary" property. The ontology may define the "Employee" object type as a child object type of the "Person" object type. Thus, the "Employee" object is also a "Person" object according to the object-centric data model.

In some example embodiments, the techniques encompass a computer-implemented method performed at one or more computing devices. The one or more computing devices include one or more processors and storage media storing one or more computer programs executed by the one or more processors to perform the method.

Performance of the method includes performing the operation of receiving an indication of a search template to use for a search of the body of data represented by the object-centric data model. The search may have a scope specified by the template. In particular, the search template may specify one or more hierarchical object types, defined in the object-centric data model, that are within the scope of the search. The search template may also specify a plurality of search fields.

Performance of the method may further include performing the operations of: based on the search template, generating a user interface that includes the plurality of search fields; and providing the user interface to a user. For at least a couple of reasons, the user interface may allow a user to search the body of data more efficiently and with higher precision and recall. One reason is that searches of the body of data initiated via the user interface may be scoped according to the one or more hierarchical object types specified in the search template. Scoping a search may involve associating a set of search fields with the one or more hierarchical object types that are specified. Another reason is that the search fields presented to the user in the user interface may be limited to those that are relevant to the one or more hierarchical object types specified in the search template. In other words, each search field may impose a property restriction on the search, the property restriction being dependent on the one or more hierarchical object types that are specified.

Example Object-Centric Data Model

FIG. 1 depicts an example object-centric data model. Referring to FIG. 1, object-centric data model 100 includes data objects 102, 104 and relationships 106A-N. Data object 102 includes object ID 108, object type 110, displayed data 112, property IDs 114A-N, and related object IDs 116. Property ID 114A is associated with property type 118, displayed type 120, and property value 122. Relationship 106N is associated with relationship type 124, displayed type 126, and related object IDs 128.

Object-centric data model 100 may be a logical data model that defines how data is represented. Object-centric data model 100 may be independent of any data storage model. For example, data may be stored in a relational database or a key-value store and still be represented by object-centric data model 100.

At a minimum, object-centric data model 100 is built on the notion of a data object 102, 104. A data object 102, 104 may represent a particular person, a particular location, a particular organization, a particular event, a particular document, or other instance of a noun. For example, a particular data object may correspond to "Barack Obama", "San Francisco", "Stanford University", "2008 Financial Crisis", etc.

A data object 102, 104 may be associated with zero or more properties. A property of a data object 102, 104 may be an attribute of the data object 102, 104 and may represent an individual data item. For example, a property may include a name, height, weight, or phone number of a person.

Data objects 102, 104 may be related based on one or more relationships 106A-N. A relationship 106A-N may be symmetric or asymmetric. For example, a pair of data objects 102, 104 may be related by an asymmetric "child of" relationship and/or a symmetric "kin of" relationship.

At the highest level of abstraction, a data object 102, 104 may be a container for information. The information may include object ID 108, object type 110, displayed data 112, property IDs 114A-N, related object IDs 116, any associated media (e.g., image, video recording, audio recording), any links to associated media, and/or any other data relevant to the data object 102, 104.

Data objects 102, 104 may be referenced based on unique identifiers that uniquely identify each data object 102, 104. Thus, a particular data object may store object ID 108, which is the unique identifier assigned to the particular data object. The particular data object may also store one or more related object IDs 116, which are the unique identifiers assigned to data objects 102, 104 that share one or more relationships 106A-N with the particular data object.

Object type 110 may indicate a category of data objects 102, 104. Example categories include "person", "location", "organization", "event", and "document". The category may be indicated by a Uniform Resource Identifier (URI). For example, if a particular data object represents "Barack Obama", then object type 110 may be "com.palantir.object.person".

Displayed data 112 may be a user-friendly representation of a particular data object. For example, displayed data 112 may include a user-friendly version of object type 110, such as "Person"; a commonly used name for the particular data object, such as "Barack Obama"; and/or a thumbnail preview of the particular data object.

If a particular data object is associated with any properties, the particular data object may store property IDs 114A-N. Each property ID of property IDs 114A-N may be associated with a property type 118, a displayed type 120, and one or more property values 122.

Property type 118 may indicate a category of properties, and displayed type 120 may be a user-friendly version of property type 118. For example, if property type 118 is "com.palantir.property.name", then displayed type 120 may be "Name". A particular data object may have multiple properties of the same type. For example, a person may have multiple aliases.

Property value 122 may include one or more values of a particular property. Multiple values may correspond to component values. For example, the property value 122 "Barack Obama" may be broken down into component values "Barack" and "Obama".

If a particular data object stores any related object IDs 116, a search for matching object identifiers may be performed to determine a relationship 106A-N with the particular data object. Each relationship of relationships 106A-N may be associated with a relationship type 124, a displayed type 126, and related object IDs 128.

Relationship type 124 may indicate a category of relationships 106A-N, and displayed type 126 may be a user-friendly version of relationship type 124. For example, if relationship type 124 is "com.palantir.relationship.appearsin", then displayed type 126 may be "Appears In". In other words, a search of data object 102 may cause displaying of displayed type 126 of relationship 106A and/or displayed data 112 of data object 104. Any further data related to data object 104 may be retrieved based on an additional search.

Example Ontology

Figure 2:
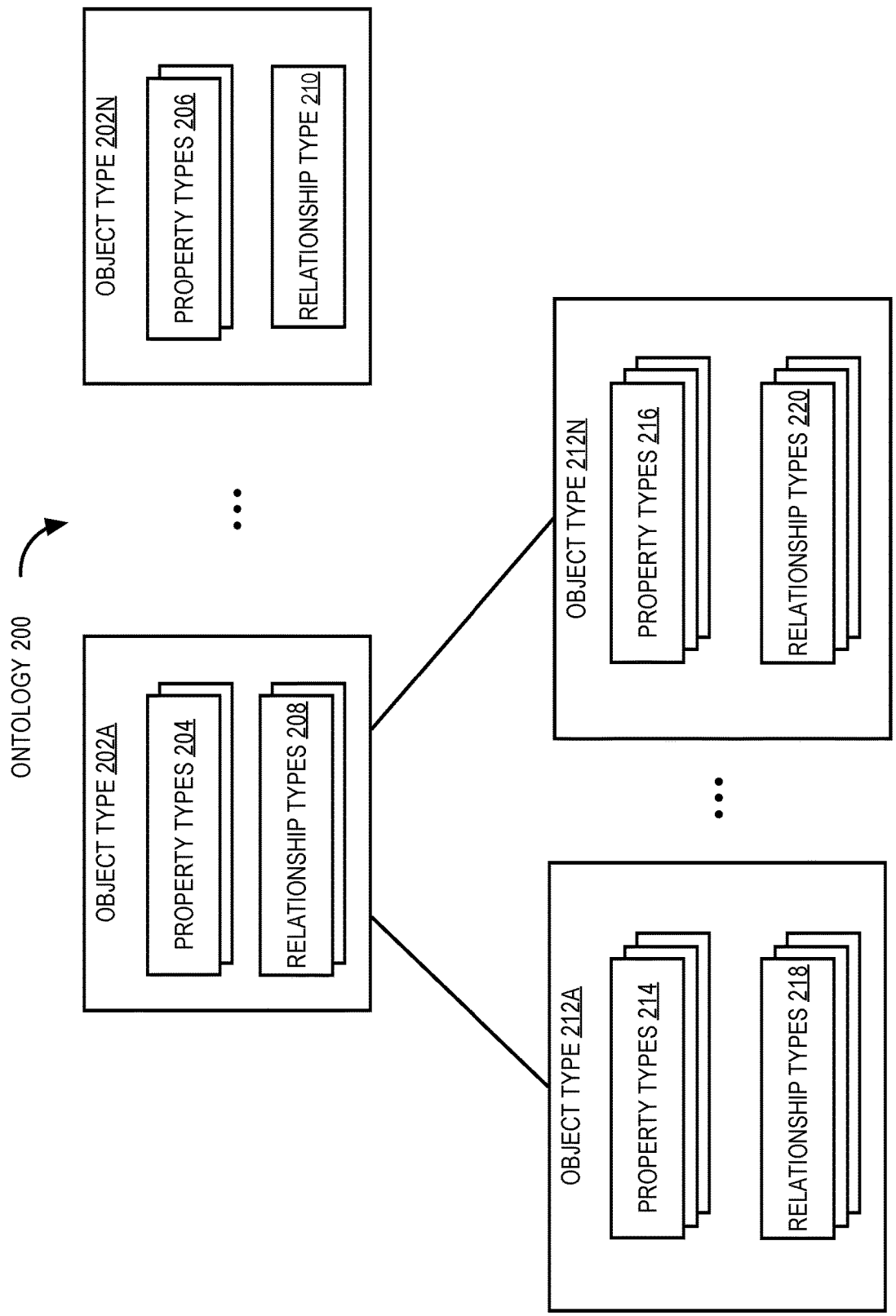
FIG. 2 depicts an example ontology.

Object-centric data model 100 may include a hierarchical data type ontology. FIG. 2 depicts an example ontology. Referring to FIG. 2, ontology 200 includes object types 202A-N, 212A-N. Each object type of object types 202A-N, 212A-N is associated with property types 204, 206, 214, 216 and one or more relationship types 208, 210, 218, 220.

Ontology 200 may be a hierarchical organization of object types 202A-N, 212A-N; property types 204, 206, 214, 216; and/or relationship types 208, 210, 218, 220. In other words, ontology 200 may define which of the property types 204, 206, 214, 216 and/or relationship types 208, 210, 218, 220 correspond to a particular object type. Ontology 200 may be static or dynamic, depending on whether it can be modified by an end user.

In the example of FIG. 2, object types 202A and 202N share the same hierarchical level but correspond to different hierarchical object types. For example, object types 202A and 202N may correspond to the hierarchical object types "Person" and "Location", respectively. Different hierarchical object types may be associated with one or more different property types 204, 206, 214, 216 and/or one or more different relationship types 208, 210, 218, 220. For example, property types 204 may include "Name", "Height", "Weight", and/or any other property types 204 that are relevant to the hierarchical object type "Person". In contrast, property types 206 may include "Name", "Latitude", "Longitude", and/or any other property types 206 that are relevant to the hierarchical object types "Location".

In FIG. 2, object types 212A-N are depicted as descending from object type 202A. In other words, object types 212A-N may be sub-types of object type 202A. For example, object types 212A and 212N correspond to the hierarchical object types "Teacher" and "Lawyer", which are both sub-types of "Person". Thus, object types 212A-N may inherit property types 204 and relationship types 208 from object type 202A. For example, property types 214 may include property types 204 and one or more additional property types 214 that are relevant to the hierarchical object type "Teacher". However, property types 214 and property types 216 may differ in at least one property type 214, 216. For example, property types 214 may include the property type "Grades Taught", whereas property types 216 may include the property type "Bar Admissions".

Hierarchical object types that share the same hierarchical level may be disjunctive and may involve disjunctive searches. For example, object types 212A and 212N may be disjunctive insofar as a data object 102, 104 associated with object type 212A is excluded from association with object type 212N. Thus, object types 212A and 212N may be searched separately.

In contrast, a search of a particular hierarchical object type may be equivalent to searching each sub-type of the particular hierarchical object type. For example, a single search of object type 202A may be the equivalent of separate searches of object types 212A-N.

Example User Interface

Figure 3:
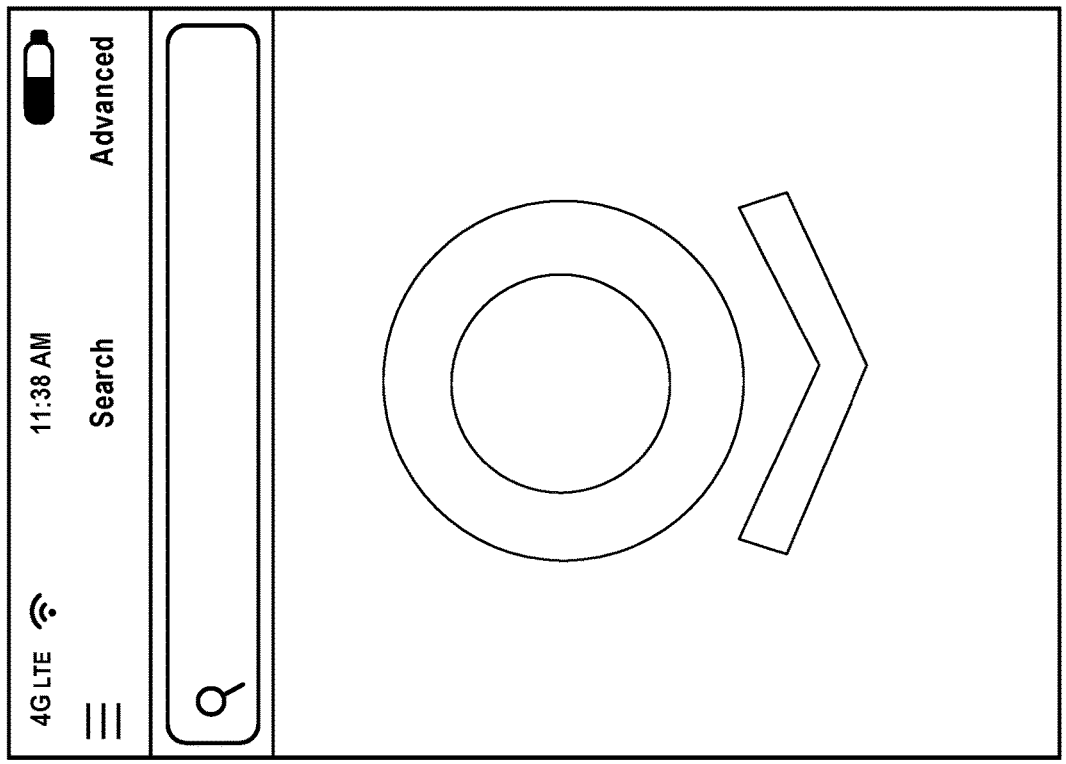
FIG. 3 depicts an example user interface.

Searches of highly structured data may be initiated based on input at a user interface. FIG. 3 depicts an example user interface. Referring to FIG. 3, user interface 300 is provided to a user of a client device.

In the example of FIG. 3, user interface 300 is associated with a native mobile application on a smartphone. In FIG. 3, user interface 300 includes a single search field for accepting one or more keywords as input. However, clicking "Advanced" (e.g., via a touch screen) may cause a different user interface to be provided to the user.

Example Plurality of Search Templates

Figure 4:
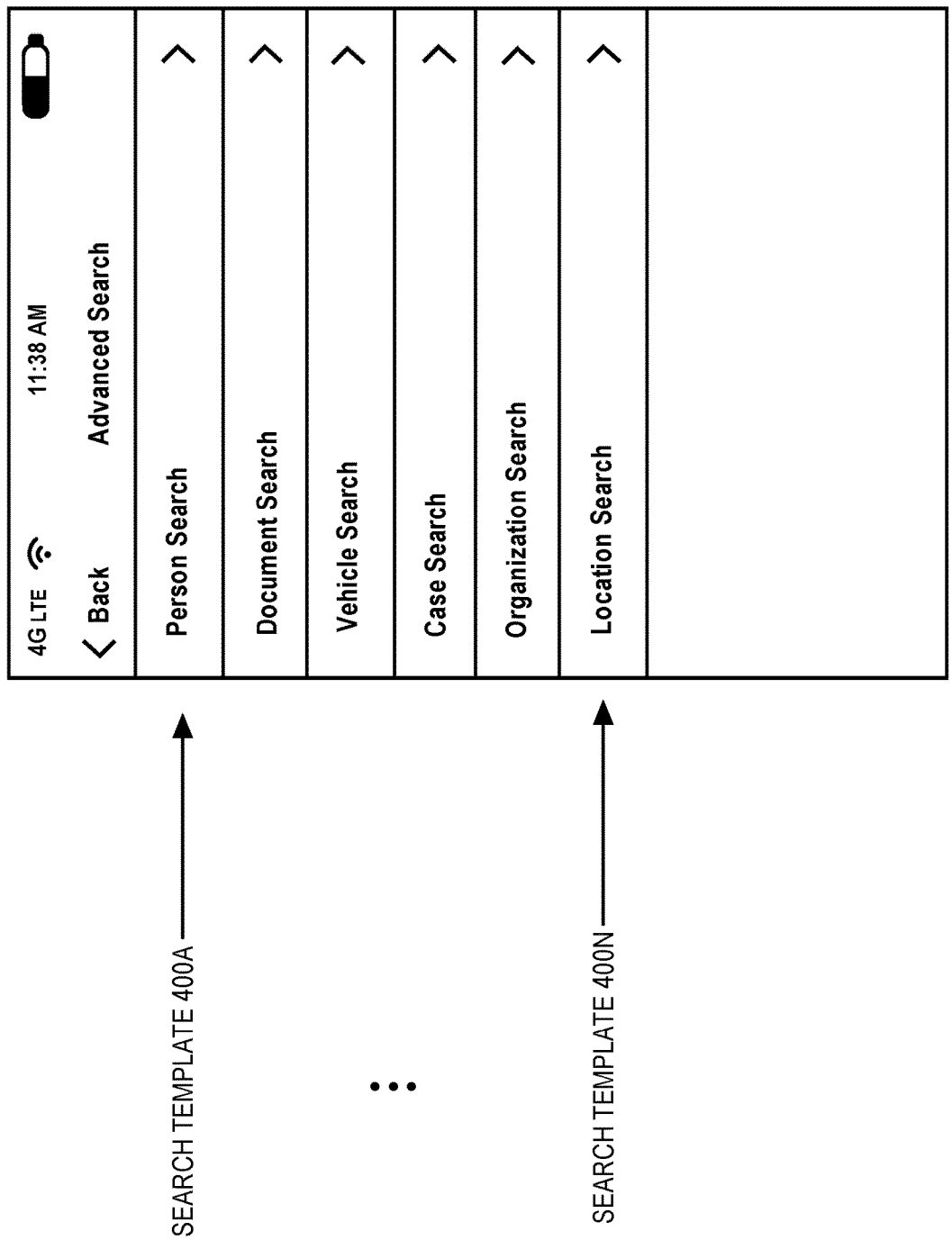
FIG. 4 depicts a plurality of example search templates.

The different user interface may include a plurality of search templates. FIG. 4 depicts a plurality of example search templates. Referring to FIG. 4, search templates 400A-N are provided to the user.

Search templates 400A-N translate user intent into search queries. Each search template of search templates 400A-N specifies a scope of a search of data represented by an object-centric data model 100. As shall be described in greater detail below, the scope of the search may be defined by a plurality of search fields specified by a selected search template.

Each search template of search templates 400A-N specifies one or more hierarchical object types within the scope of the search. The one or more hierarchical object types may include disjunctive object types. Additionally or alternatively, the one or more hierarchical object types may include a hierarchical object type as well as a sub-type of the hierarchical object type.

For example, in FIG. 4, search template 400A corresponds to the hierarchical object type "Person". As mentioned above, a search of a particular object type may be equivalent to searching each sub-type of the particular object type. Thus, any sub-type of a hierarchical object type that is within the scope of the search is also within the scope of the search. For example, the hierarchical object types "Teacher" and "Lawyer" are also within the scope of the search specified by search template 400A. In other words, a "Person" search may be implemented as separate searches of "Teacher" and "Lawyer" that are performed disjunctively.

In another example, a user may modify the plurality of search templates 400A-N of FIG. 4 to include a customized search template that specifies the hierarchical object types "Person" and "Location". The customized search template may be generated by editing an existing search template or creating a new search template. Thus, the customized search template may specify disjunctive searches of "Person" and "Location".

Approaches for Obtaining Input to Search Fields

Selecting a particular search template may cause generating a user interface 300 that includes a plurality of search fields. For example, FIG. 5A depicts an example plurality of search fields 500A-N provided to the user in response to selecting a particular search template. In an embodiment, a search field may accept a keyword and/or a property value 122 as input.

Each search template of search templates 400A-N may specify search fields 500A-N that correspond to relevant property types associated with one or more data objects 102, 104 that are within the scope of the search defined by the search template. In the example of FIG. 5A, the particular search template may be a customized search template specifying disjunctive searches for a "Person" and a "Document". Thus, search fields 500A-N may correspond to relevant property types associated with the hierarchical object types "Person" and "Document".

Each search field of the plurality of search fields 500A-N may be associated with a displayed type 120. For example, search field 500A follows the displayed type 120 "First". Furthermore, each search field of the plurality of search fields 500A-N accepts input specifying a property value 122. For example, search field 500A accepts input specifying the property value 122 "John". Note that input need not be provided to all of the search fields 500A-N. Furthermore, there may be hidden search fields associated with fixed property values, such as "USA" in a hidden "Country" search field.

Referring to FIG. 5A, there is a "Properties" section that includes search field 500A (hereinafter "property filter"). A property filter may specify a conjunctive search for each property type 118 that is provided with a property value 122. For example, a conjunctive search may be performed for the first name "John" and the last name "Smith".

FIG. 5A also depicts a "Date Range" section that includes search field 500N (hereinafter "intrinsic date search"). An intrinsic date search is typically used with the hierarchical object types "Document" and "Event". An "intrinsic date" may be a date of creation, a date of occurrence, a date of publication, or any other property that can be represented as a date.

Figure 5B:
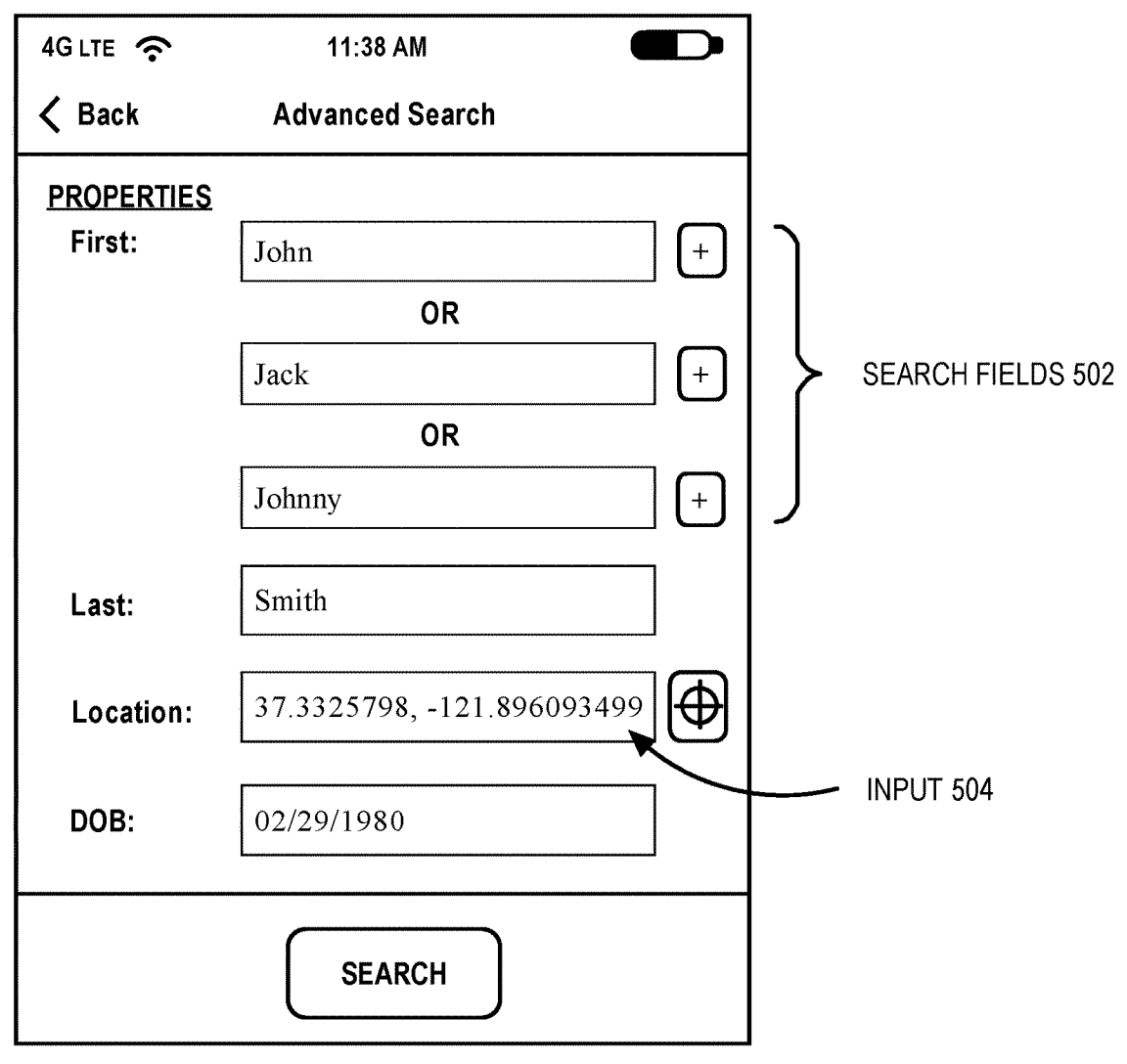

A particular search field may obtain input in any of a number of different ways. Each search field of the plurality of search fields 500A-N is associated with an input type (e.g., SIMPLE, DATE, NUMERIC, ENUM, MAP). Thus, search fields 500A-N may include a text entry field, a date picker, a numeric keypad, a selectable list, an interactive map, or any other interface for obtaining input. FIG. 5B depicts a user interface 300 that obtains input in multiple ways.

Referring to FIG. 5B, each search field of search fields 502 corresponds to the same property type "First". Selecting a "+" button may add an additional search field to search fields 502. Search fields 502 are disjunctive search fields. In other words, each property value 122 provided to search fields 502 may be searched disjunctively. However, search fields 502 may still be searched conjunctively with any other search fields.

Figure 5C:
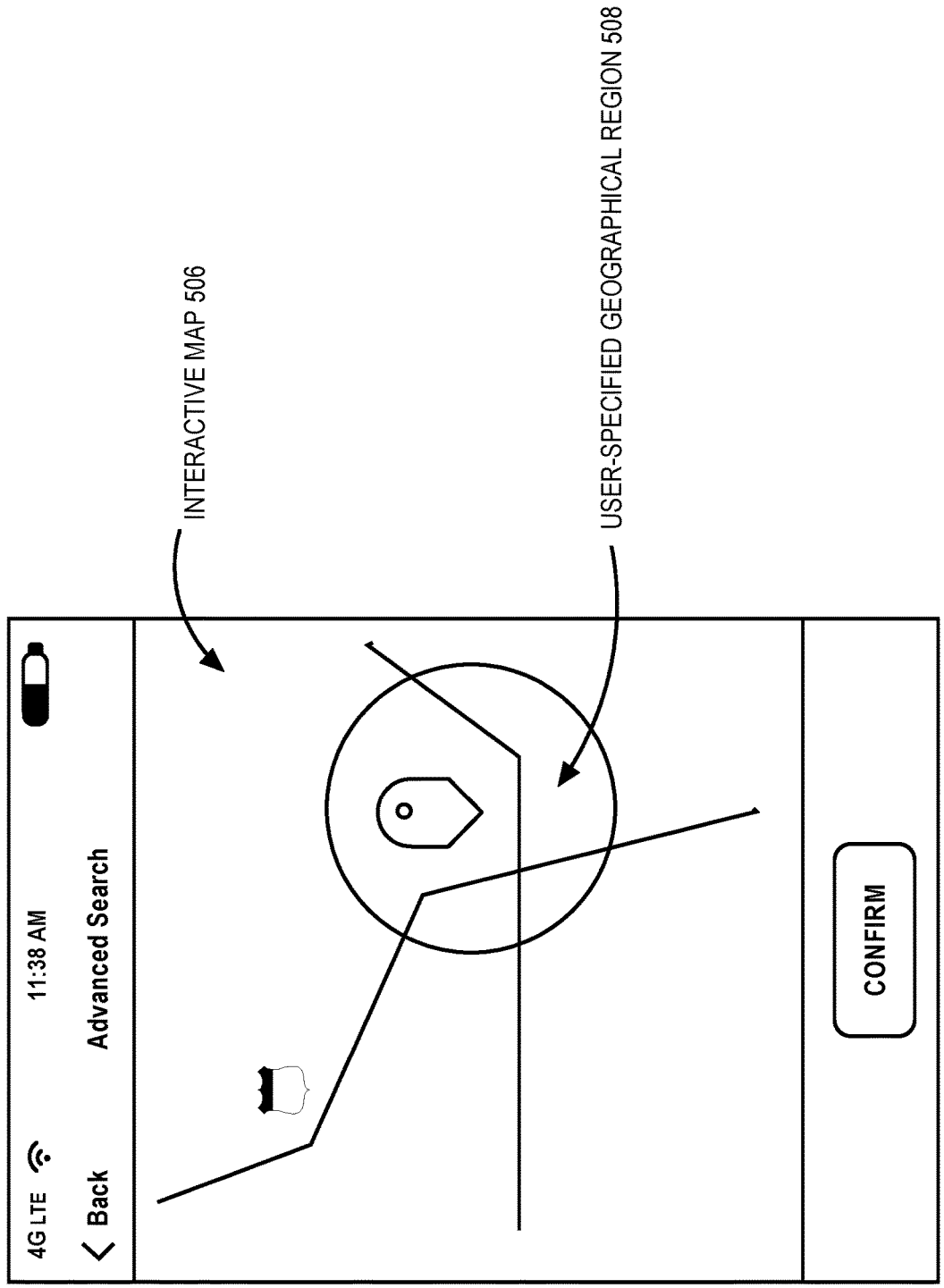

FIG. 5B also depicts input 504 obtained for the property type "Location". Input 504 may have been obtained based on selecting the crosshairs button adjacent to the "Location" search field. The crosshairs button may have caused the user to be provided with the interface depicted in FIG. 5C.

FIG. 5C depicts an example map interface including an interactive map 506. The user may add a geolocation pin to the interactive map 506. The geolocation pin may indicate a particular location and/or the center of a geographical region relevant to a search. For example, a geo-fenced search may be performed based on a user-specified geographical region 508. Thus, a particular search template may restrict a search to one or more locations. For example, the particular search template may restrict a scope of a search to one or more geographic regions.

In an embodiment (not shown), an input 504 to a particular search field may be obtained from a camera and/or any other hardware of the client computer at which the user interface 300 is displayed. For example, a camera may be used to populate search fields with measurements (e.g., distance between eyes, length of face, width of face) that can be used for face recognition.

Example Customizable Format for Search Results

Figure 6:
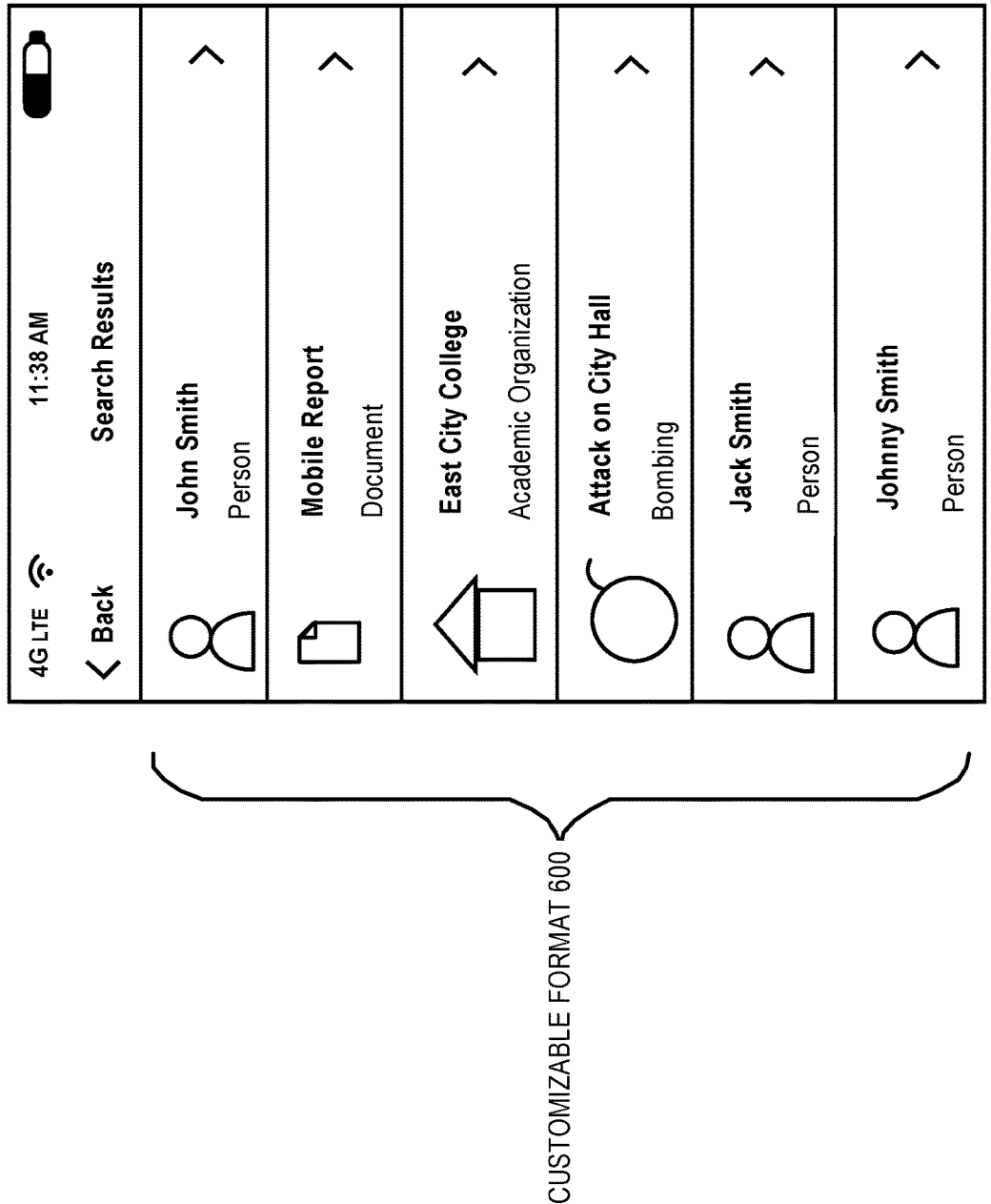
FIG. 6 depicts an example customizable format for search results.

After a search is performed, search results may be retrieved and provided to the user. The search results may be provided in any number of different formats, which may be customized by the user. FIG. 6 depicts an example customizable format for search results.

Referring to FIG. 6, customizable format 600 includes a list of search results. The list may be arranged in any order. For example, the list may be organized based on hierarchical object type.

Search results may be presented in any of a number of different ways. Each search result may include some or all of the displayed data 112 associated with the search result. Additionally or alternatively, one or more search results may be plotted on a map. Additionally or alternatively, the search results may be represented graphically using any of the techniques described in U.S. patent application Ser. No. 13/608,864, filed Sep. 10, 2012, the entirety of which is incorporated herein by reference. Additionally or alternatively, the search results may be provided as selectable histograms using any of the techniques described in U.S. patent application Ser. No. 14/676,621, filed Apr. 1, 2015, the entirety of which is incorporated herein by reference.

In addition to the search results, the user may be provided with past search results. For example, the results of recent searches may be provided to the user as a list. Current and/or past search results may be used to modify search templates 400A-N.

Example Detailed Views of a Search Result

Figure 7:
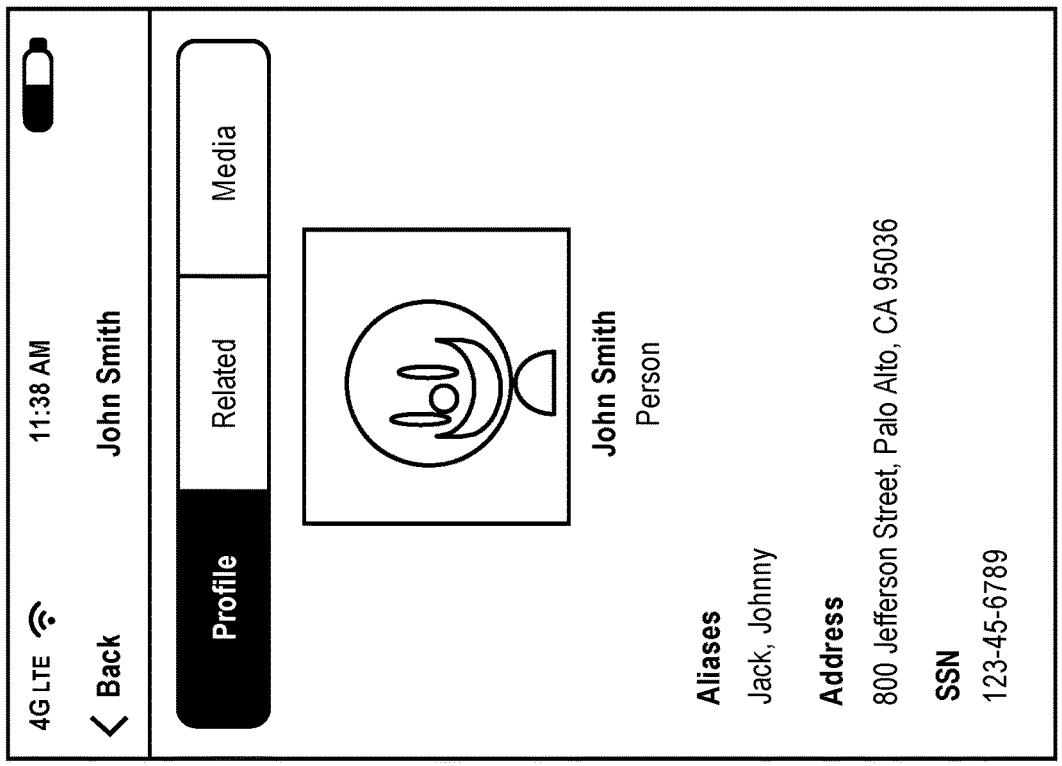
FIG. 7, FIG. 8, FIG. 9 depict example detailed views of a search result.
Figure 8:
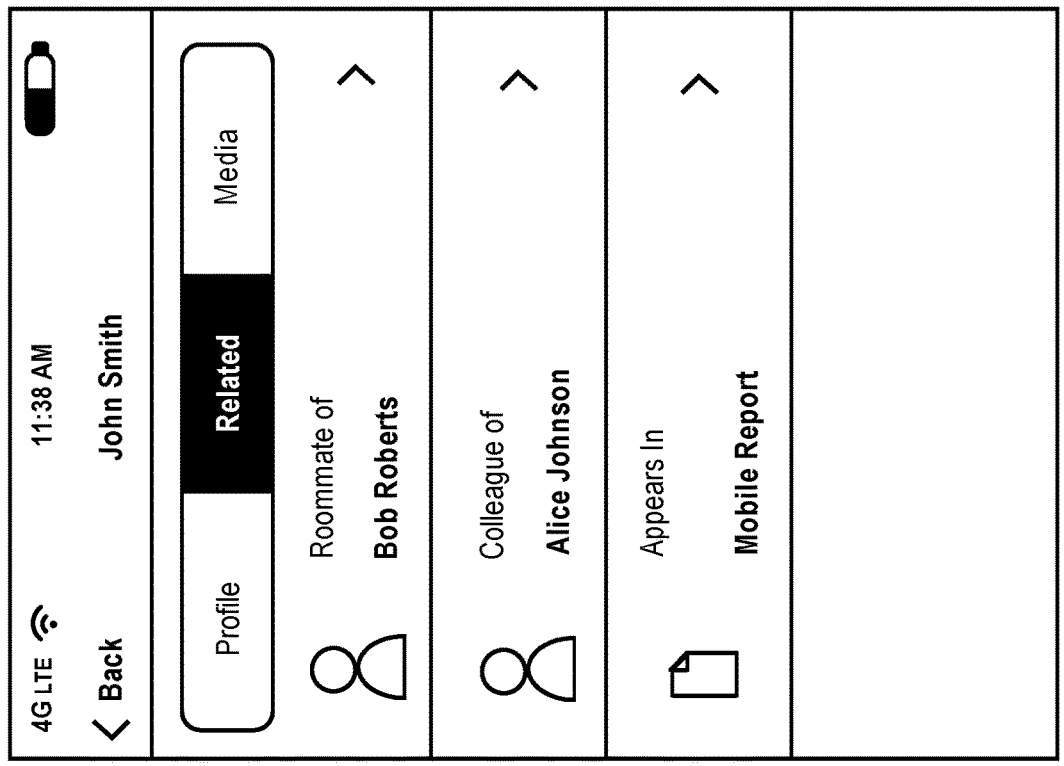
Figure 9:
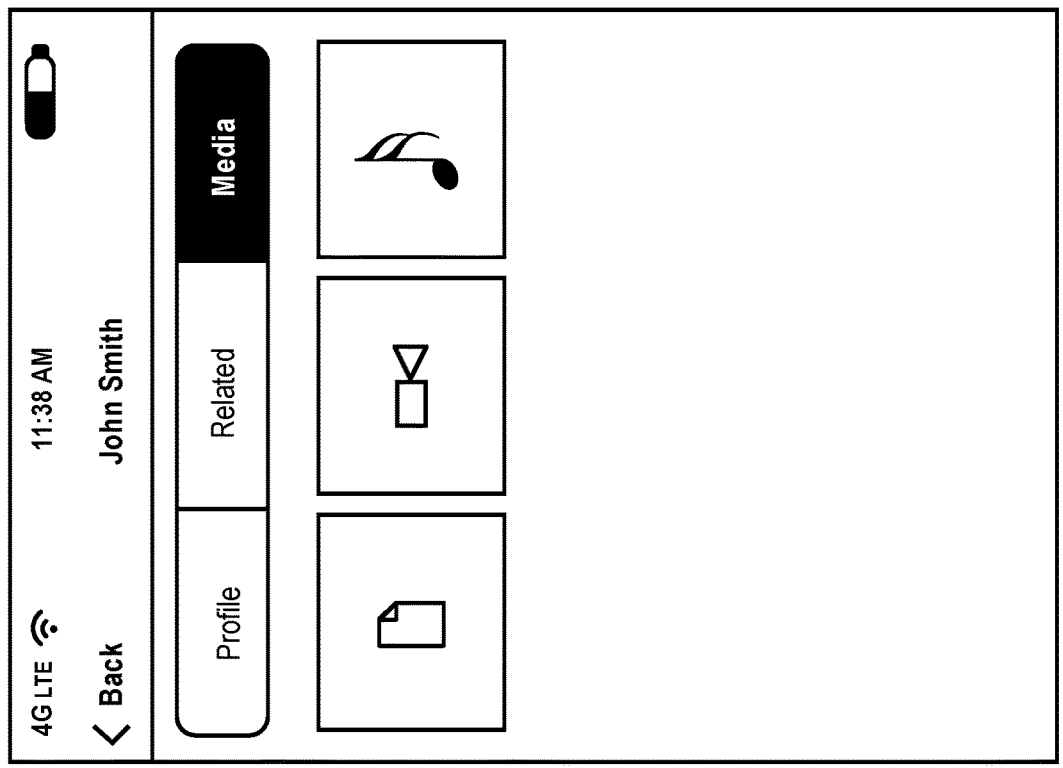

Selecting a particular search result may cause the user to be provided with one or more detailed views of the particular search result. FIGS. 7-9 depict example detailed views of a search result.

FIG. 7 depicts an example "Profile" view. This view may include a summary of properties associated with a particular data object. In the example of FIG. 7, this view includes displayed data 112 associated with the particular data object as well as displayed type 120 and property value 122 for each property of the particular data object.

The user can do any of a number of things with a particular data object obtained as a search result. The user can edit the particular data object. For example, the user can modify a property and store the modified data object in the data store from which the unmodified data object was retrieved. Additionally or alternatively, the user can share the particular data object with another user. For example, the user may send a link to the particular data object to another user. Additionally or alternatively, the user can specify additional searches to be performed based on the particular data object using any of the techniques described in U.S. patent application Ser. No. 13/608,864. Additionally or alternatively, a search result may be geotagged (e.g., associated with a particular location).

FIG. 8 depicts an example "Related" view. This view may include any data objects 102, 104 that are related to the particular data object obtained as a search result. In the example of FIG. 8, this view includes displayed type 126 of each relationship between the particular data object and a related data object as well as the displayed data 112 associated with the related data object.

FIG. 9 depicts an example "Media" view. This view may include links to any media data associated with the particular data object obtained as a search result. Selecting a media link may cause media data to be rendered in a suitable manner. For example, selecting a video file may cause the video file to be presented in a video player.

Process Overview

Figure 10:
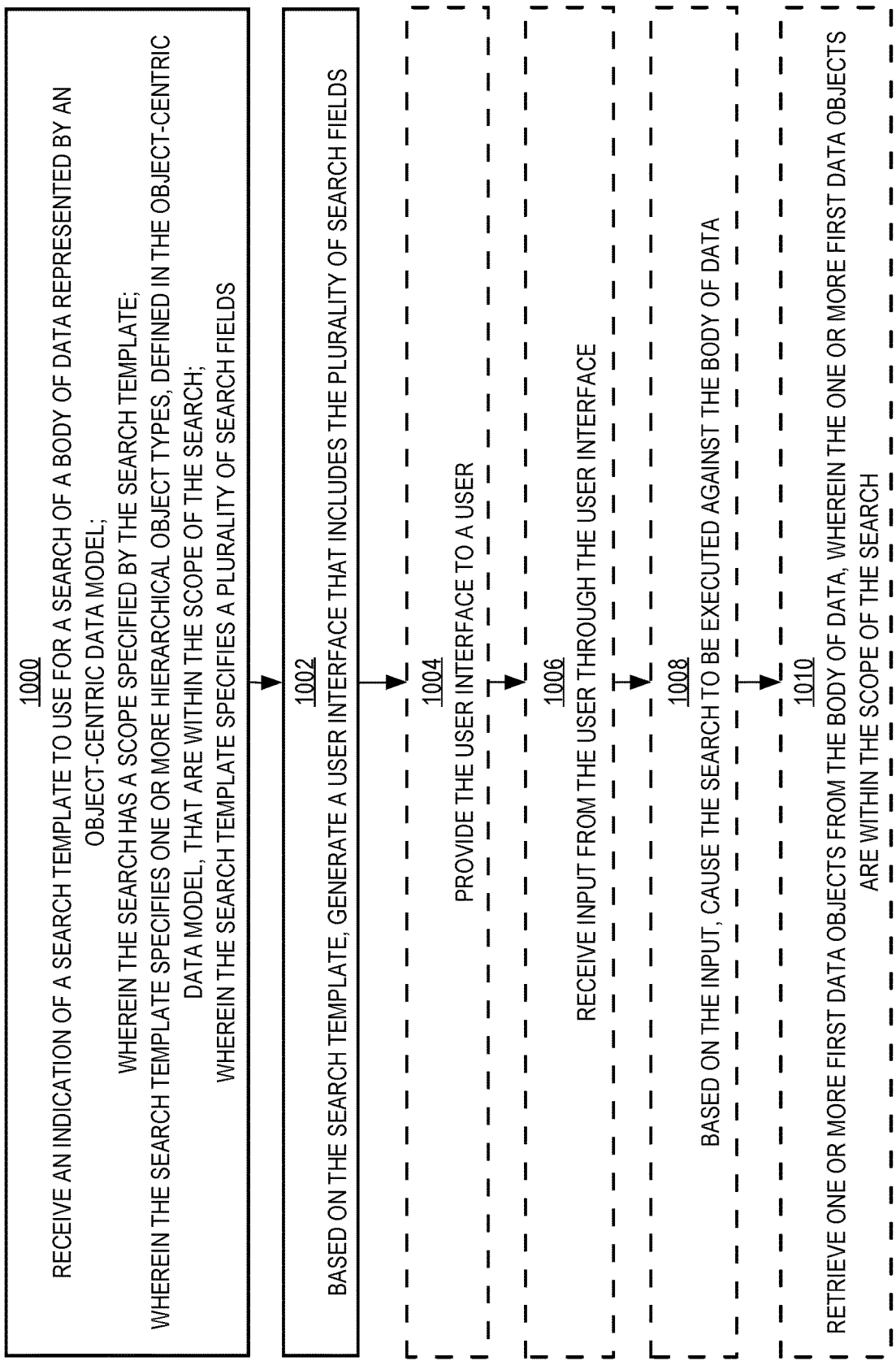
FIG. 10 is a flow diagram that depicts an approach for searching highly structured data, according to some example embodiments of the present invention.

FIG. 10 is a flow diagram that depicts an approach for searching highly structured data. At block 1000, an indication of a search template is received. The indication may include user input (e.g., input indicating a user's selection of a search template in a user interface) and/or a network message (e.g., a HTTP message that indicates a user's selection of a search template). The indication may specify that the search template is to be used for a search of data represented by an object-centric data model. The search template may specify the scope of the search, which may include one or more hierarchical object types that are defined in the object-centric data model. The search template may also specify a plurality of search fields.

For example, a user may select a "Person" search template. The "Person" search template may specify that a search is to be performed for data belonging to the "Person" object type. A "Person" object type is associated with certain property types. Thus, selecting the "Person" search template specifies these property types.

At block 1002, a user interface is generated based on the search template. The user interface may include the plurality of search fields. For example, the property types specified by the "Person" search template may translate into search fields corresponding to a person's name, age, address, phone number, etc.

At optional block 1004, the user interface is provided to a user. For example, search fields may be provided to the user so that the user can input property values to be matched when the search is performed.

At optional block 1006, input is received from the user through the user interface. The input may be in any of a number of formats. For example, the input may be a text entry, an interaction with a map, a selection from an enumerated list, etc.

At optional block 1008, the search is performed based on the input. For example, text input may be enclosed with wildcard operators, such as "*", and matched against stored property values.

At optional block 1010, one or more first data objects are retrieved as a result of performing the search. The one or more first data objects are data objects that fell within the scope of the search. Any of a number of subsequent actions may be performed based on the one or more first data objects, including searching for one or more second data object that did not fall within the scope of the search.

Example Computer System

Figure 11:
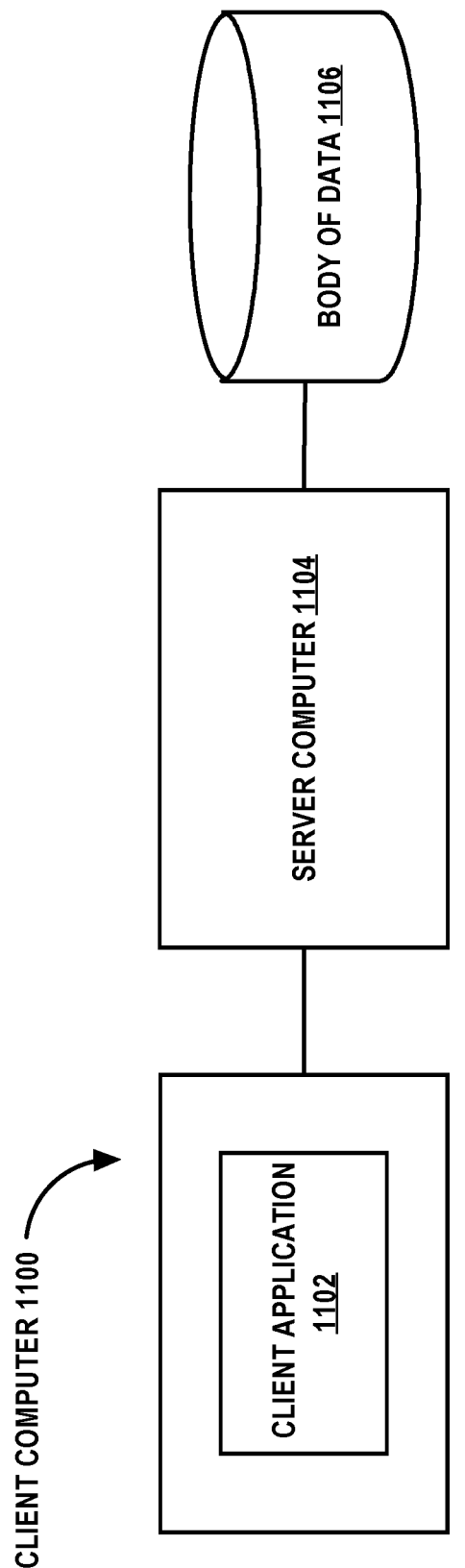
FIG. 11 depicts an example computer system in which embodiments may be implemented.

FIG. 11 depicts an example computer system in which embodiments may be implemented. Referring to FIG. 11, client computer 1100 includes client application 1102. Client computer 1100 is communicatively coupled to server computer 1104, which is communicatively coupled to body of data 1106.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. A computer may be a client and/or a server. Any reference to "a computer" herein may mean one or more computers, unless expressly stated otherwise.

Client application 1102 may be a sequence of instructions executing at client computer 1100. At a minimum, client application 1102 may provide, to a user, any of the interfaces described in FIGS. 2-9. For example, client application 1102 may be a program executing in a web browser or a native mobile app. Client application 1102 may be installed on client computer 1100 to provide any of a number of benefits. The benefits may include faster execution, lower network latency and bandwidth consumption, and/or better access to the hardware of client computer 1100. Furthermore, a client application 1102 installed on client computer 1100 enables the client application 1102 to operate in an offline mode. For example, search results may be saved locally on client computer 1100 so that a user can interact with them without an Internet connection.

Server computer 1104 may include one or more computers, such as a web server, a mobile server, a gateway server, and/or a load-balancing server. A gateway server may regulate access to other servers, including structured data servers and unstructured data servers. Structured data servers may be computers that facilitate searches of structured data, such as data stored in an object-centric data model. Unstructured data servers may be computers that facilitate searches of unstructured data, such as by implementing text searches of documents. Server computer 1104 may send data to client computer 1100 using JavaScript Object Notation (JSON), Extensible Markup Language (XML), and/or any other data interchange format.

Body of data 1106 may represent the data being searched. For example, body of data 1106 may be stored in a database, a configuration file, and/or any other system and/or data structure that stores data. Additionally or alternatively, body of data 1106 may be stored in memory on server computer 1104. Additionally or alternatively, body of data 1106 may be stored in non-volatile storage. For example, body of data 1106 may be stored in a mobile database communicatively coupled to a mobile server and/or a repository communicatively coupled to a gateway server.

A user's access to body of data 1106 may be limited based on access controls. Thus, a search of a body of data 1106 may be restricted to data to which the user has access.

Basic Computing Device

Figure 12:
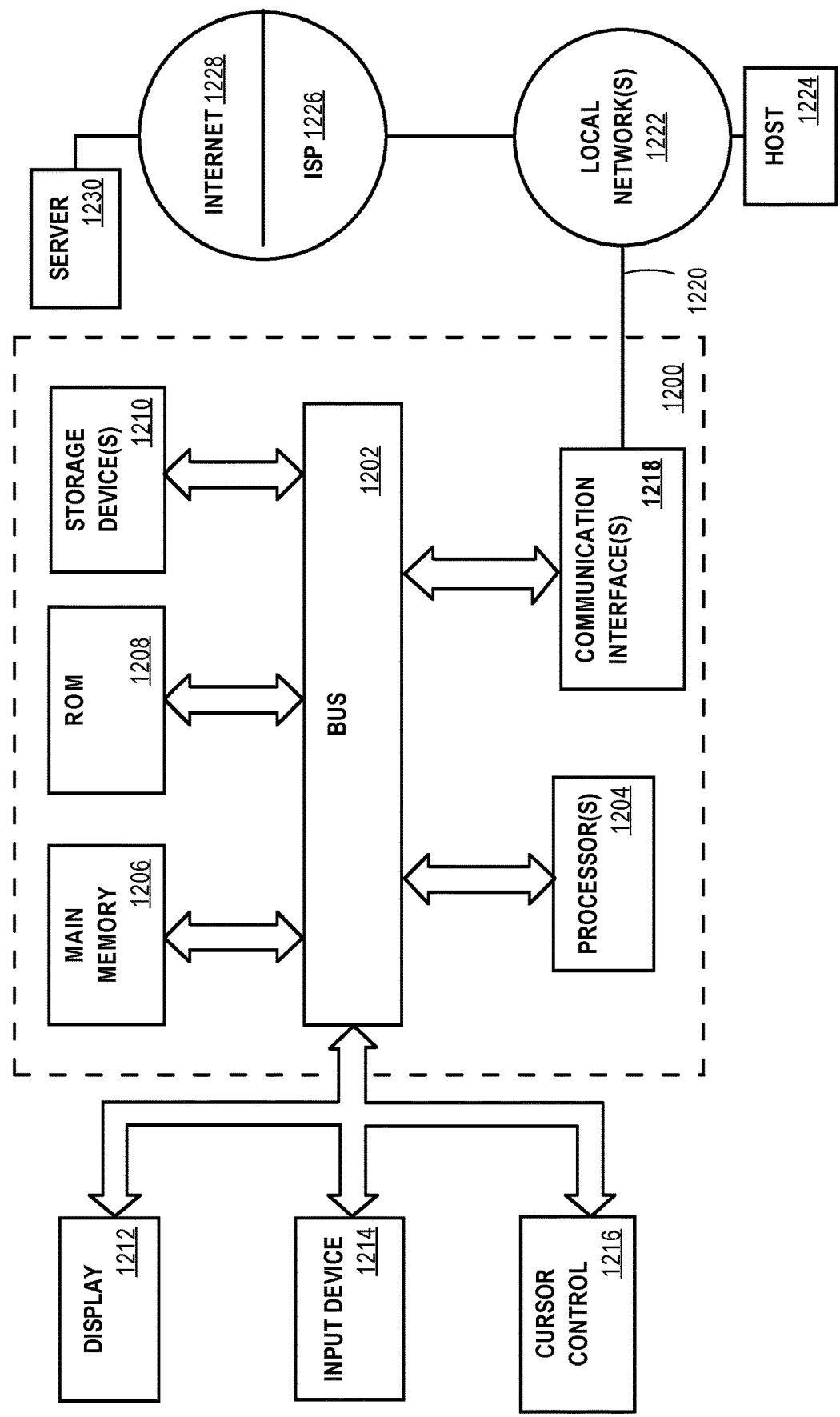
FIG. 12 is a very general block diagram of a computing device in which the example embodiment(s) of the present Application may be embodied.

Referring now to FIG. 12, it is a block diagram that illustrates a basic computing device 1200 in which the example embodiment(s) of the present Application may be embodied. Computing device 1200 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 1200 may include a bus 1202 or other communication mechanism for addressing main memory 1206 and for transferring data between and among the various components of device 1200.

Computing device 1200 may also include one or more hardware processors 1204 coupled with bus 1202 for processing information. A hardware processor 1204 may be a general purpose microprocessor, a system on a chip (SoC), or other processor.

Main memory 1206, such as a random access memory (RAM) or other dynamic storage device, also may be coupled to bus 1202 for storing information and software instructions to be executed by processor(s) 1204. Main memory 1206 also may be used for storing temporary variables or other intermediate information during execution of software instructions to be executed by processor(s) 1204.

Software instructions, when stored in storage media accessible to processor(s) 1204, render computing device 1200 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 1200 also may include read only memory (ROM) 1208 or other static storage device coupled to bus 1202 for storing static information and software instructions for processor(s) 1204.

One or more mass storage devices 1210 may be coupled to bus 1202 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 1210 (e.g., the main hard disk for the device) stores a body of program and data for directing operation of the computing device, including an operating system, user application programs, driver and other support files, as well as other data files of all sorts.

Computing device 1200 may be coupled via bus 1202 to display 1212, such as a liquid crystal display (LCD) or other electronic visual display, for displaying information to a computer user. In some configurations, a touch sensitive surface incorporating touch detection technology (e.g., resistive, capacitive, etc.) may be overlaid on display 1212 to form a touch sensitive display for communicating touch gesture (e.g., finger or stylus) input to processor(s) 1204.

An input device 1214, including alphanumeric and other keys, may be coupled to bus 1202 for communicating information and command selections to processor 1204. In addition to or instead of alphanumeric and other keys, input device 1214 may include one or more physical buttons or switches such as, for example, a power (on/off) button, a "home" button, volume control buttons, or the like.

Another type of user input device may be a cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

While in some configurations, such as the configuration depicted in FIG. 12, one or more of display 1212, input device 1214, and cursor control 1216 are external components (i.e., peripheral devices) of computing device 1200, some or all of display 1212, input device 1214, and cursor control 1216 are integrated as part of the form factor of computing device 1200 in other configurations.

Functions of the disclosed systems, methods, and modules may be performed by computing device 1200 in response to processor(s) 1204 executing one or more programs of software instructions contained in main memory 1206. Such software instructions may be read into main memory 1206 from another storage medium, such as storage device(s) 1210. Execution of the software instructions contained in main memory 1206 cause processor(s) 1204 to perform the functions of the example embodiment(s).

While functions and operations of the example embodiment(s) may be implemented entirely with software instructions, hard-wired or programmable circuitry of computing device 1200 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more software instructions to processor(s) 1204 for execution. For example, the software instructions may initially be carried on a magnetic disk or solid-state drive of a remote computer. The remote computer can load the software instructions into its dynamic memory and send the software instructions over a telephone line using a modem. A modem local to computing device 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor(s) 1204 retrieves and executes the software instructions. The software instructions received by main memory 1206 may optionally be stored on storage device(s) 1210 either before or after execution by processor(s) 1204.

Computing device 1200 also may include one or more communication interface(s) 1218 coupled to bus 1202. A communication interface 1218 provides a two-way data communication coupling to a wired or wireless network link 1220 that is connected to a local network 1222 (e.g., Ethernet network, Wireless Local Area Network, cellular phone network, Bluetooth wireless network, or the like). Communication interface 1218 sends and receives electrical, electromagnetic, or optical signals that carry digital data streams representing various types of information. For example, communication interface 1218 may be a wired network interface card, a wireless network interface card with an integrated radio antenna, or a modem (e.g., ISDN, DSL, or cable modem).

Network link(s) 1220 typically provide data communication through one or more networks to other data devices. For example, a network link 1220 may provide a connection through a local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network(s) 1222 and Internet 1228 use electrical, electromagnetic or optical signals that carry digital data streams. The signals through the various networks and the signals on network link(s) 1220 and through communication interface(s) 1218, which carry the digital data to and from computing device 1200, are example forms of transmission media.

Computing device 1200 can send messages and receive data, including program code, through the network(s), network link(s) 1220 and communication interface(s) 1218. In the Internet example, a server 1230 might transmit a requested code for an application program through Internet 1228, ISP 1226, local network(s) 1222 and communication interface(s) 1218.

The received code may be executed by processor 1204 as it is received, and/or stored in storage device 1210, or other non-volatile storage for later execution.

Basic Software System

Figure 13:
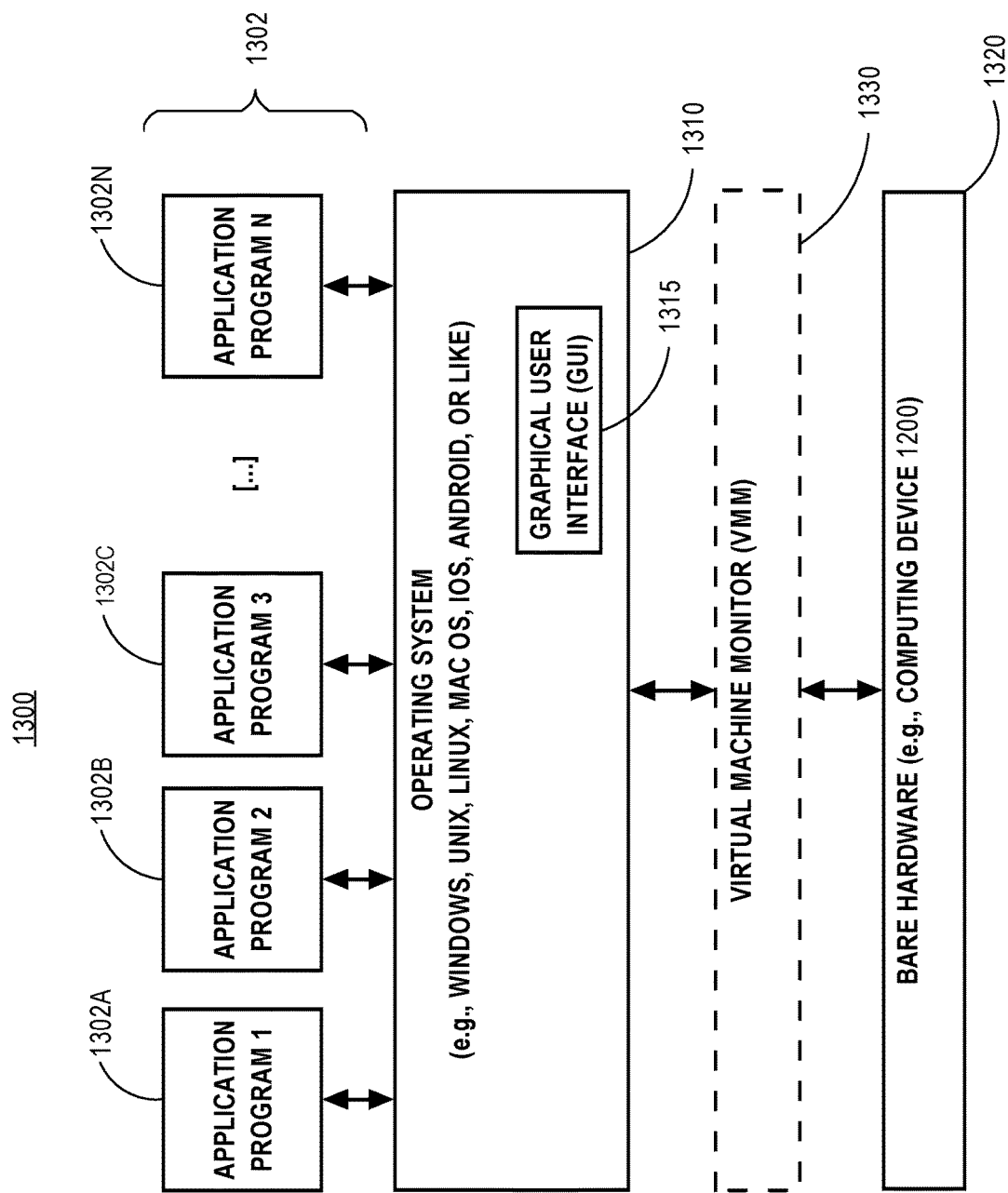
FIG. 13 is a block diagram of a basic software system for controlling the operation of the computing device.

FIG. 13 is a block diagram of a basic software system 1300 that may be employed for controlling the operation of computing device 1200. Software system 1300 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1300 is provided for directing the operation of computing device 1200. Software system 1300, which may be stored in system memory (RAM) 1206 and on fixed storage (e.g., hard disk or flash memory) 1210, includes a kernel or operating system (OS) 1310.

The OS 1310 manages low-level aspects of computer operation, including managing execution of processes, memory allocation, file input and output (I/O), and device I/O. One or more application programs, represented as 1302A, 1302B, 1302C . . . 1302N, may be "loaded" (e.g., transferred from fixed storage 1210 into memory 1206) for execution by the system 1300. The applications or other software intended for use on device 1300 may also be stored as a set of downloadable computer-executable instructions, for example, for downloading and installation from an Internet location (e.g., a Web server, an app store, or other online service).

Software system 1300 includes a graphical user interface (GUI) 1315, for receiving user commands and data in a graphical (e.g., "point-and-click" or "touch gesture") fashion. These inputs, in turn, may be acted upon by the system 1300 in accordance with instructions from operating system 1310 and/or application(s) 1302. The GUI 1315 also serves to display the results of operation from the OS 1310 and application(s) 1302, whereupon the user may supply additional inputs or terminate the session (e.g., log off).

OS 1310 can execute directly on the bare hardware 1320 (e.g., processor(s) 1204) of device 1200. Alternatively, a hypervisor or virtual machine monitor (VMM) 1330 may be interposed between the bare hardware 1320 and the OS 1310. In this configuration, VMM 1330 acts as a software "cushion" or virtualization layer between the OS 1310 and the bare hardware 1320 of the device 1200.

VMM 1330 instantiates and runs one or more virtual machine instances ("guest machines"). Each guest machine comprises a "guest" operating system, such as OS 1310, and one or more applications, such as application(s) 1302, designed to execute on the guest operating system. The VMM 1330 presents the guest operating systems with a virtual operating platform and manages the execution of the guest operating systems.

In some instances, the VMM 1330 may allow a guest operating system to run as if it is running on the bare hardware 1320 of device 1200 directly. In these instances, the same version of the guest operating system configured to execute on the bare hardware 1320 directly may also execute on VMM 1330 without modification or reconfiguration. In other words, VMM 1330 may provide full hardware and CPU virtualization to a guest operating system in some instances.

In other instances, a guest operating system may be specially designed or configured to execute on VMM 1330 for efficiency. In these instances, the guest operating system is "aware" that it executes on a virtual machine monitor. In other words, VMM 1330 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, the example embodiment(s) of the present Application have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A computer-implemented method, comprising:
receiving a selection of a particular search template from a plurality of search templates to be used for a computer-implemented search of digital data stored within an object-centric data model,
the object-centric data model defining data objects and relationships between data objects and being based on a hierarchical ontology having hierarchical object types with associated property types,
the particular search template specifying one or more hierarchical object types of the object-centric data model that define a scope of the search and at least one search field related to at least one object type of the one or more hierarchical object types,
each search field of the particular search template imposing a property restriction on the search, the property restriction being dependent on the one or more hierarchical object types that are specified,
the at least one search field including one or more search fields that accept input from an interactive map,
two different search templates of the plurality of search templates having respective search fields corresponding to different sets of object types that include a common object type;
based on the particular search template, generating a user interface for an electronic visual display,
the user interface representing the at least one search field for the search as at least one input area,
the user interface allowing adding a specific input area based on the at least one search field related to the at least one object type;
in response to receiving a request including an object of the at least one object type to perform a search through the user interface that includes the specific input area, performing a search within the scope based on the request including searching each sub-type of the at least one object type;
retrieving a result of the search including one or more first data objects from the object-centric data model; and
providing, in the user interface, the one or more first data objects that are geotagged.

2. The method of claim 1, wherein the at least one input area includes one or more input areas that accept input from the interactive map.

3. The method of claim 1, wherein the particular search template restricts the search to a user-specified geographical region.

4. The method of claim 1, wherein a particular property type associated with the one or more hierarchical object types corresponds to two or more disjunctive search fields in the at least one search field.

5. The method of claim 1, wherein the one or more hierarchical object types include two or more disjunctive object types.

6. The method of claim 1, further comprising providing one or more second data objects that are outside the scope of the search based on one or more relationships, defined in the object-centric data model, between the one or more first data objects and the one or more second data objects.

7. The method of claim 1, wherein the particular search template specifies the scope of the search.

8. The method of claim 1, further comprising providing the user interface to the electronic visual display subsequent to generating the user interface.

9. The method of claim 1, wherein the one or more hierarchical object types include two or more disjunctive object types.

10. A computer system, comprising:
one or more processors; and
one or more non-transitory data storage media storing one or more programs that are configured for execution by the one or more processors, the one or more programs comprising one or more sequences of instructions which when executed using the one or more processors cause the one or more processors to perform:
receiving a selection of a particular search template from a plurality of search templates to be used for a computer-implemented search of digital data stored within an object-centric data model,
the object-centric data model defining data objects and relationships between data objects and being based on a hierarchical ontology having hierarchical object types with associated property types,
the particular search template specifying one or more hierarchical object types of the object-centric data model that define a scope of the search and at least one search field related to at least one object type of the one or more hierarchical object types,
each search field of the particular search template imposing a property restriction on the search, the property restriction being dependent on the one or more hierarchical object types that are specified,
the at least one search field including one or more search fields that accept input from an interactive map,
two different search templates of the plurality of search templates having respective search fields corresponding to different sets of object types that include a common object type;
based on the particular search template, generating a user interface for an electronic visual display,
the user interface representing the at least one search field for the search as at least one input area,
the user interface allowing adding a specific input area based on the at least one search field related to the at least one object type;
in response to receiving a request including an object of the at least one object type to perform a search through the user interface that includes the specific input area, performing a search within the scope based on the request including searching each sub-type of the at least one object type;
retrieving a result of the search including one or more first data objects from the object-centric data model; and
providing, in the user interface, the one or more first data objects that are geotagged.

11. The computer system of claim 10, wherein the at least one input area includes one or more input areas that accept input from the interactive map.

12. The computer system of claim 10, wherein the particular search template restricts the search to a user-specified geographical region.

13. The computer system of claim 10, wherein a particular property type associated with the one or more hierarchical object types corresponds to two or more disjunctive search fields in the at least one search field.

14. The computer system of claim 10, the one or more sequences of instructions which when executed using the one or more processors causing the one or more processors to perform providing one or more second data objects that are outside the scope of the search based on one or more relationships, defined in the object-centric data model, between the one or more first data objects and the one or more second data objects.

15. The computer system of claim 10, wherein the particular search template specifies the scope of the search.

16. The computer system of claim 10, further comprising sequences of instructions which when executed cause providing the user interface to the electronic visual display subsequent to generating the user interface.

* * * * *